(12) United States Patent
Baba

(10) Patent No.: US 11,726,259 B2
(45) Date of Patent: Aug. 15, 2023

(54) OPTICAL CIRCUIT ELEMENT, OPTICAL COMMUNICATION APPARATUS, AND METHOD FOR MANUFACTURING OPTICAL CIRCUIT ELEMENT

(71) Applicant: FUJITSU OPTICAL COMPONENTS LIMITED, Kawasaki (JP)

(72) Inventor: Takeshi Baba, Tsukuba (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/164,500

(22) Filed: Feb. 1, 2021

(65) Prior Publication Data

US 2021/0239905 A1 Aug. 5, 2021

(30) Foreign Application Priority Data

Feb. 4, 2020 (JP) ................. 2020-017253

(51) Int. Cl.
*G02B 6/122* (2006.01)
*G02B 6/13* (2006.01)
*H04B 10/40* (2013.01)
*H04J 14/06* (2006.01)
*G02B 6/12* (2006.01)

(52) U.S. Cl.
CPC ............. *G02B 6/1228* (2013.01); *G02B 6/13* (2013.01); *H04B 10/40* (2013.01); *G02B 2006/12097* (2013.01); *H04J 14/06* (2013.01)

(58) Field of Classification Search
CPC .................... G02B 6/1228; G02B 6/13; G02B 2006/12097; H04B 10/40
See application file for complete search history.

(56) References Cited

U.S. PATENT DOCUMENTS

| | | | |
|---|---|---|---|
| 9,977,187 B2* | 5/2018 | Shi | G02B 6/125 |
| 10,241,273 B2* | 3/2019 | Tu | G02B 6/2766 |
| 10,367,598 B2* | 7/2019 | Testa | H04J 14/06 |
| 10,488,590 B2* | 11/2019 | Park | G02B 6/2766 |
| 2009/0136173 A1 | 5/2009 | Logvin et al. | |

(Continued)

FOREIGN PATENT DOCUMENTS

| | | |
|---|---|---|
| JP | 2014-194478 | 10/2014 |
| JP | 2014-215609 | 11/2014 |

(Continued)

OTHER PUBLICATIONS

Japanese Office Action issued in corresponding Japanese Application No. 2020-017253 dated May 30, 2023.

*Primary Examiner* — Tina M Wong
(74) *Attorney, Agent, or Firm* — Staas & Halsey LLP

(57) ABSTRACT

An optical circuit element formed on a substrate, the optical circuit element includes a first waveguide and a second waveguide, the second waveguide having a shape in a width direction, the shape being asymmetrical to the first waveguide. The first waveguide includes a first segment and a second segment, the first segment having a width that changes along a light propagation direction, the second segment continuous with the first segment. The second waveguide includes a coupled waveguide adjacent to the second segment of the first waveguide. At least one of the second segment and the coupled waveguide has a shape with a width that changes along the light propagation direction.

16 Claims, 15 Drawing Sheets

(56) References Cited

U.S. PATENT DOCUMENTS

| | | | |
|---|---|---|---|
| 2014/0133796 A1* | 5/2014 | Dong | G02B 6/126 385/11 |
| 2014/0294380 A1 | 10/2014 | Sugiyama et al. | |
| 2014/0314367 A1 | 10/2014 | Kojima et al. | |
| 2016/0178841 A1 | 6/2016 | Oka et al. | |
| 2017/0176680 A1 | 6/2017 | Oka | |
| 2018/0231713 A1 | 8/2018 | Picard | |

FOREIGN PATENT DOCUMENTS

| | | |
|---|---|---|
| JP | 2015-121696 A | 7/2015 |
| JP | 2016-511448 | 4/2016 |
| JP | 2017-044780 A | 3/2017 |
| WO | WO 2014/150697 A1 | 9/2014 |
| WO | 2014/208601 A1 | 12/2014 |
| WO | WO 2016/052343 A1 | 4/2016 |

* cited by examiner

| | | W1(µm) | | | |
| --- | --- | --- | --- | --- | --- |
| | 0.65 | 0.675 | 0.7 | 0.725 | 0.75 |
| 0.28 | 0.1344 | | 0.2526 | | 0.3473 |
| 0.305 | | 0.058 | 0.1137 | 0.1636 | |
| W2(µm) 0.33 | 0.1071 | 0.0446 | 0 | 0.0499 | 0.0948 |
| 0.355 | | 0.1376 | 0.0819 | 0.032 | |
| 0.38 | 0.2767 | | 0.1585 | | 0.0637 |

| | | W1(µm) | | | |
| --- | --- | --- | --- | --- | --- |
| | 0.65 | 0.675 | 0.7 | 0.725 | 0.75 |
| 0.28 | -4.59 | | -9.81 | | -10.14 |
| 0.305 | | -3.16 | -13.5 | -13.59 | |
| W2(µm) 0.33 | -16.7 | -2.91 | 0 | 0 | -1.3 |
| 0.355 | | -11.33 | -2.17 | -2.14 | |
| 0.38 | -9.68 | | -8.64 | | -4.06 |

| | | W1 (µm) | | | | |
|---|---|---|---|---|---|---|
| | | 0.75 | 0.775 | 0.8 | 0.825 | 0.85 |
| | 0.28 | -0.94 | | -2.33 | | -3.78 |
| | 0.305 | | -0.075 | -1.79 | -3.29 | -2.96 |
| W2 (µm) | 0.33 | -4.19 | -2.26 | 0 | 0.49 | -0.2 |
| | 0.355 | | -3.61 | -3.3 | -0.9 | -1.33 |
| | 0.38 | -7.13 | | -3.75 | | -3.31 |

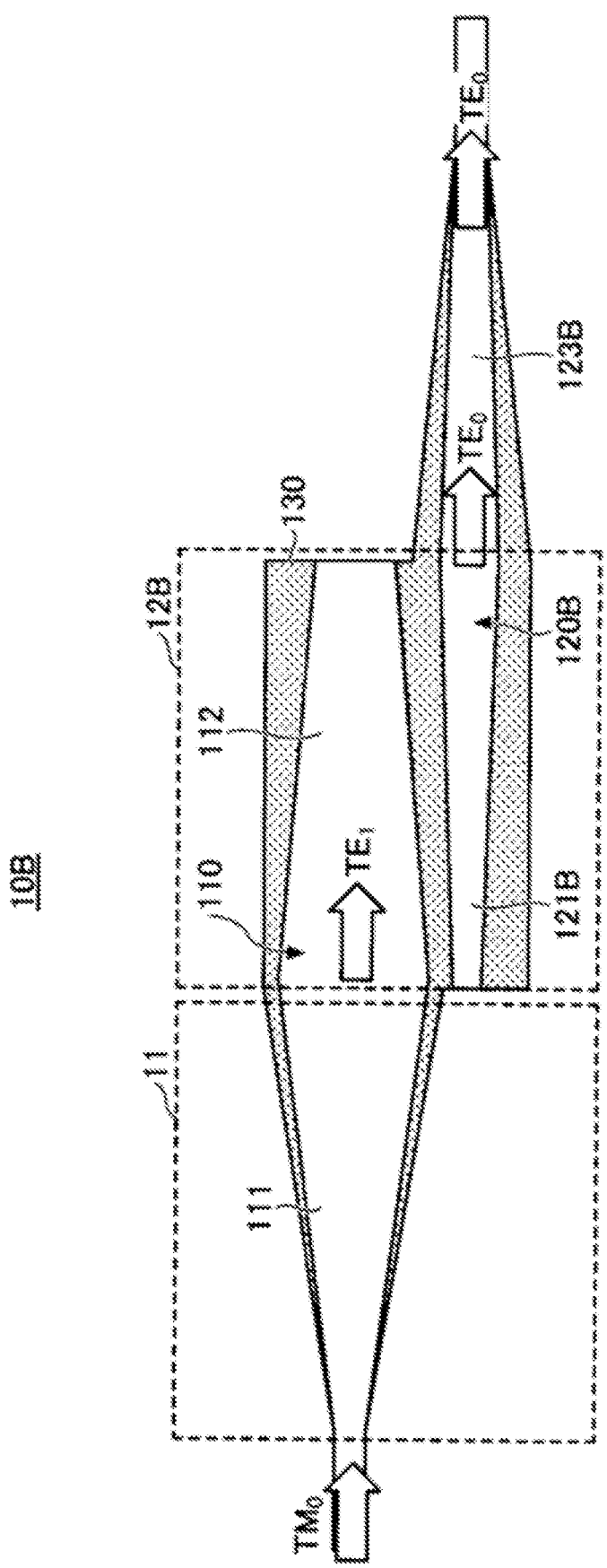

| | | W1 (µm) | | | | |
|---|---|---|---|---|---|---|
| | | 0.675 | 0.7 | 0.725 | 0.75 | 0.775 |
| | 0.23 | -0.04024 | | -2.95151 | | -5.73395 |
| | 0.255 | | -0.50401 | 0.238664 | -1.57885 | |
| W2 (µm) | 0.28 | -0.4381 | -0.03859 | 0 | 0.266911 | -0.24651 |
| | 0.305 | | -1.14639 | 0.127345 | -0.08038 | |
| | 0.33 | -4.3102 | | -4.07111 | | -0.05737 |

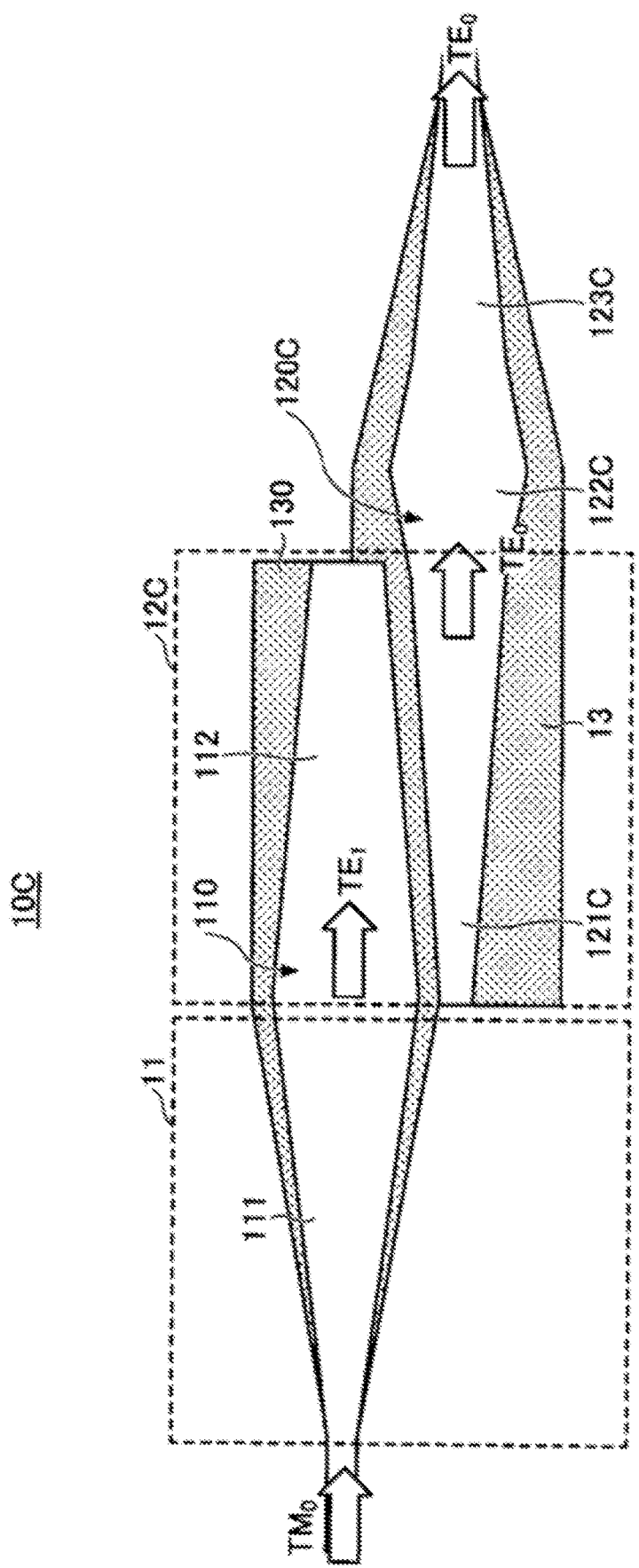

OPTICAL CIRCUIT ELEMENT, OPTICAL COMMUNICATION APPARATUS, AND METHOD FOR MANUFACTURING OPTICAL CIRCUIT ELEMENT

CROSS-REFERENCE TO RELATED APPLICATION

This application is based upon and claims the benefit of priority of the prior Japanese Patent Application No. 2020-17253, filed on Feb. 4, 2020, the entire contents of which are incorporated herein by reference.

FIELD

The embodiments discussed herein are related to an optical circuit element, an optical communication apparatus, and a method for manufacturing the optical circuit element.

BACKGROUND

With the spread of information communication terminals represented by smartphones and the progress of Internet of Things (IoT) technology or the like, the demand for large-capacity optical communication networks is increasing. The transmission side implements large-capacity transmission by multi-valued optical modulation signals and wavelength division multiplexing (WDM), and the reception side handles high-speed large-capacity communication by digital coherent transmission technology. By adopting a polarization multiplexing method, the amount of information per unit time is doubled.

Meanwhile, there is a demand for miniaturization of optical transceivers, and silicon photonics technology is beginning to be adopted. In silicon photonics, optical circuit elements such as an optical coupler, a polarization rotator, a polarizing beam splitter, and an optical modulator are monolithically integrated on a silicon chip.

A configuration to perform higher-order polarization conversion between TE1 mode and TM0 mode, using a vertically asymmetric core structure in which the width of an upper core and the width of a lower core are different is known (see, for example, International Publication Pamphlet No. WO 2014/208601).

International Publication Pamphlet No. WO 2014/208601 is disclosed as related art.

SUMMARY

According to an aspect of the embodiments, an optical circuit element formed on a substrate, the optical circuit element includes a first waveguide and a second waveguide having a shape in a width direction, the shape being asymmetrical to the first waveguide, wherein the first waveguide includes a first segment and a second segment, the first segment having a width that changes along alight propagation direction, the second segment continuous with the first segment, the second waveguide includes a coupled waveguide adjacent to the second segment of the first waveguide, and at least one of the second segment and the coupled waveguide has a shape with a width that changes along the light propagation direction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a schematic plan view of an optical circuit element of a second embodiment;

FIG. 11 is diagram illustrating effect of improving tolerance for manufacturing errors and a polarization extinction ratio of a configuration of the second embodiment;

FIG. 12 is a schematic plan view of an optical circuit element according to a third embodiment;

DESCRIPTION OF EMBODIMENTS

In the related art, a polarization conversion configuration realizes conversion between TE0 mode and TM0 mode by combining a higher-order polarization conversion element with an asymmetric directional coupler. The mode conversion between TE1 and TE0 is performed by the asymmetric directional coupler. The asymmetric directional coupler has low tolerance for deviation in waveguide width due to manufacturing error. When the waveguide width deviates from a design value, an effective refractive index for TE1 mode light and an effective refractive index for TE0 mode light are different from each other, conversion efficiency decreases, and intensity of output light decreases.

An object of the present embodiment is to improve tolerance for manufacturing errors and the like in an optical circuit element and suppress variations among each of products.

An embodiment increases the tolerance for manufacturing errors of an optical circuit element monolithically formed on a substrate such as a polarization rotator or a polarization converter and suppresses variations among each of products. In particular, the embodiment suppresses variations in transmission characteristics of converted light, and highly maintains intensity of output light. Before describing a specific configuration of an embodiment, technical problems found by the inventor will be described.

Figures 1A, 1B, 1C:
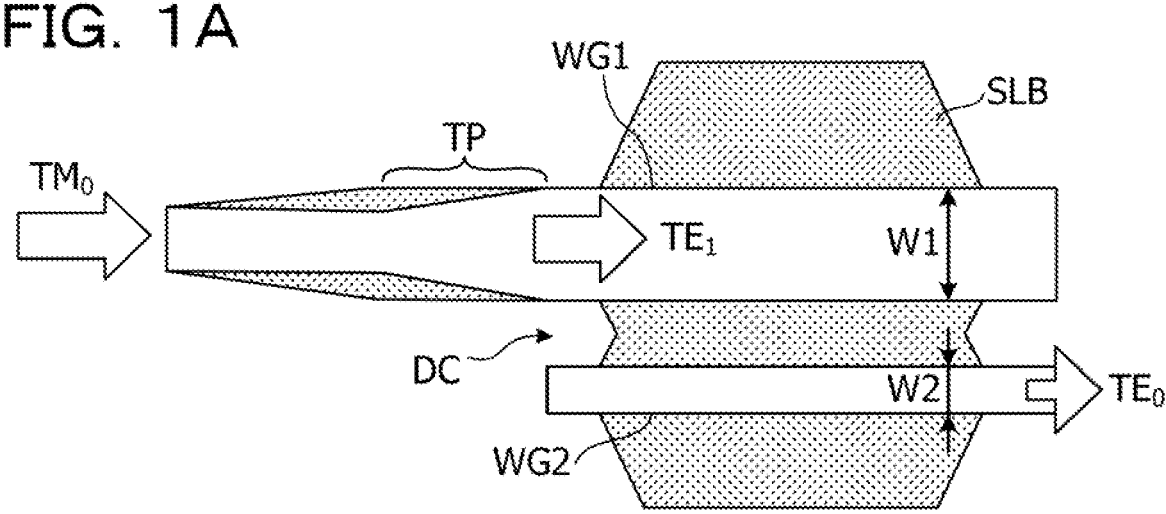
FIG. 1A is diagram for describing a technical problem found by the inventor.
FIG. 1B is diagram for describing a technical problem found by the inventor.
FIG. 1C is diagram for describing a technical problem found by the inventor.

FIGS. 1A to 1C are diagrams illustrating low tolerance for manufacturing errors and deterioration of transmission characteristics in a known configuration. FIG. 1A is a schematic diagram of a known polarization rotator, FIG. 1 is a diagram illustrating error distribution of a refractive index of an optical waveguide in the known configuration, and FIG. 1C is a diagram illustrating attenuation of transmission intensity of the TE0 mode light in the known configuration.

In FIG. 1A, a first waveguide WG1 and a second waveguide WG2 having different waveguide widths form a directional coupler DC that is asymmetrical in a horizontal direction, that is, in a right-left direction with respect to a center line between the two waveguides. The first waveguide WG1 and the second waveguide WG2 are rib waveguides formed on a slab waveguide SLB. The slab waveguide SLB may be referred to as a "lower core", and the first waveguide WG1 and the second waveguide WG2 may be referred to as an "upper core". When the lower core and the upper core are combined, the shape of the entire core is asymmetrical with respect to a center in a height direction. For example, the TM0 mode light is incident on the first waveguide WG1 and propagates through a rib waveguide TP having a tapered shape in plane, thereby to be converted into the TE1 mode light. Since, in the tapered rib waveguide TP, the symmetry in the height direction collapses, the TM0 mode and the TE1 mode are coupled near a center position in a length direction of a tapered region, and mode conversion is adiabatically performed.

The TE1 mode light is coupled to the second waveguide WG2 as TE0 mode light by the asymmetric directional coupler DC and is output. In the asymmetric directional coupler DC, an optimum coupling length is selected such that an effective refractive index perceived by the TE1 mode light propagating through the first waveguide WG1 with a width W1 accords with the refractive index perceived by the TE0 mode light propagating through the second waveguide WG2 with a width W2. Thereby, mode conversion is performed between the TE1 mode (higher-order mode) and the TE0 mode (basic mode) when the first waveguide WG1 is coupled to the second waveguide WG2.

The asymmetric directional coupler DC has low tolerance for manufacturing errors in waveguide width. Due to the variation in waveguide width, the refractive index of the waveguide perceived by the TE1 mode light and the refractive index of the waveguide perceived by the TE0 mode light deviate even though the coupling length is optimally designed, and the conversion efficiency between TE0 and TE1 decreases.

FIG. 1B is a two-dimensional map of a difference in refractive index. The horizontal direction represents the width W1 of the first waveguide WG1, and the vertical direction represents the width W2 of the second waveguide WG2. The condition of W1=0.7 μm and W2=0.33 μm is optimum design values (center condition) in which the difference in refractive index with respect to light between the TE1 mode and the TE0 mode is zero or minimized. Each of the width W1 and the width W2 is changed in 25-nm increments within a range of ±50 nm from the center condition without changing a pitch (center distance).

When the width W1 of the first waveguide WG1 changes in an increasing direction and the width W2 of the second waveguide WG2 changes in a decreasing direction (the upper right corner of the matrix), the difference in refractive index becomes the largest. Furthermore, when the width W1 changes in the decreasing direction and the width W2 changes in the increasing direction (the lower left corner of the matrix), the difference in refractive index is also large. When the distance between the first waveguide WG1 and the second waveguide WG2 fluctuates as the width W2 becomes narrow or thick even if the width W1 does not change, the difference in refractive index between the TE1 mode and the TE0 mode becomes large.

Not only in the worst case but also when at least one of W1 and W2 deviates from the design value, the difference in refractive index perceived by the TE1 mode light and the TE0 mode light becomes large, and the tolerance for manufacturing errors of the asymmetric directional coupler deteriorates.

FIG. 1C illustrates a two-dimensional map of transmittance intensity of the TE0 mode light. The transmission intensity of when the light incident in the TE1 mode is output as TE0 mode light is calculated by a finite difference time domain (FDTD) method and is mapped with respect to the deviation in the waveguide width W1 and the deviation in the waveguide width W2. The calculation is performed on the assumption that the distance between the first waveguide WG1 and the second waveguide WG2 is 150 nm.

The attenuation under the center condition (W1=0.7 μm and W2=0.33 μm) is 0 dB. Even if the width W2 of the second waveguide WG2 does not change, the attenuation becomes large as the width W1 of the first waveguide WG1 becomes narrow. In a case where the width W1 of the first waveguide WG1 does not change or slightly widens, the attenuation becomes large as the width W2 of the second waveguide WG2 shifts toward the narrower side. The intensity of a TE0 component output with respect to the input TM0 mode light deteriorates, and a polarization extinction ratio deteriorates. Not only in the worst condition but when at least one of W1 and W2 deviates from the design value, the polarization extinction ratio between the TE0 component and a TM0 component deteriorates.

Moreover, there may be a problem of deterioration of the polarization extinction ratio due to mixture of a polarization rotation component. In the configuration illustrated in FIG. 1A, the light converted into the TE0 mode by the asymmetric directional coupler DC is output as it is. In the case where the TM0 mode component is mixed with the TE0 mode light, the TM0 mode light is also output as it is, so that the output intensity of the TE0 light decreases.

In an embodiment, the optical waveguide forming the optical circuit element is designed in an arrangement or shape that easily absorbs the manufacturing errors of the asymmetric directional coupler, thereby increasing the tolerance for the manufacturing errors and suppressing manufacturing variation. As a result, the conversion efficiency between the TE1 mode and the TE0 mode is improved. In a favorable configuration example, the optical waveguide is designed to have a filter function to remove unintended polarization components.

Figure 2:
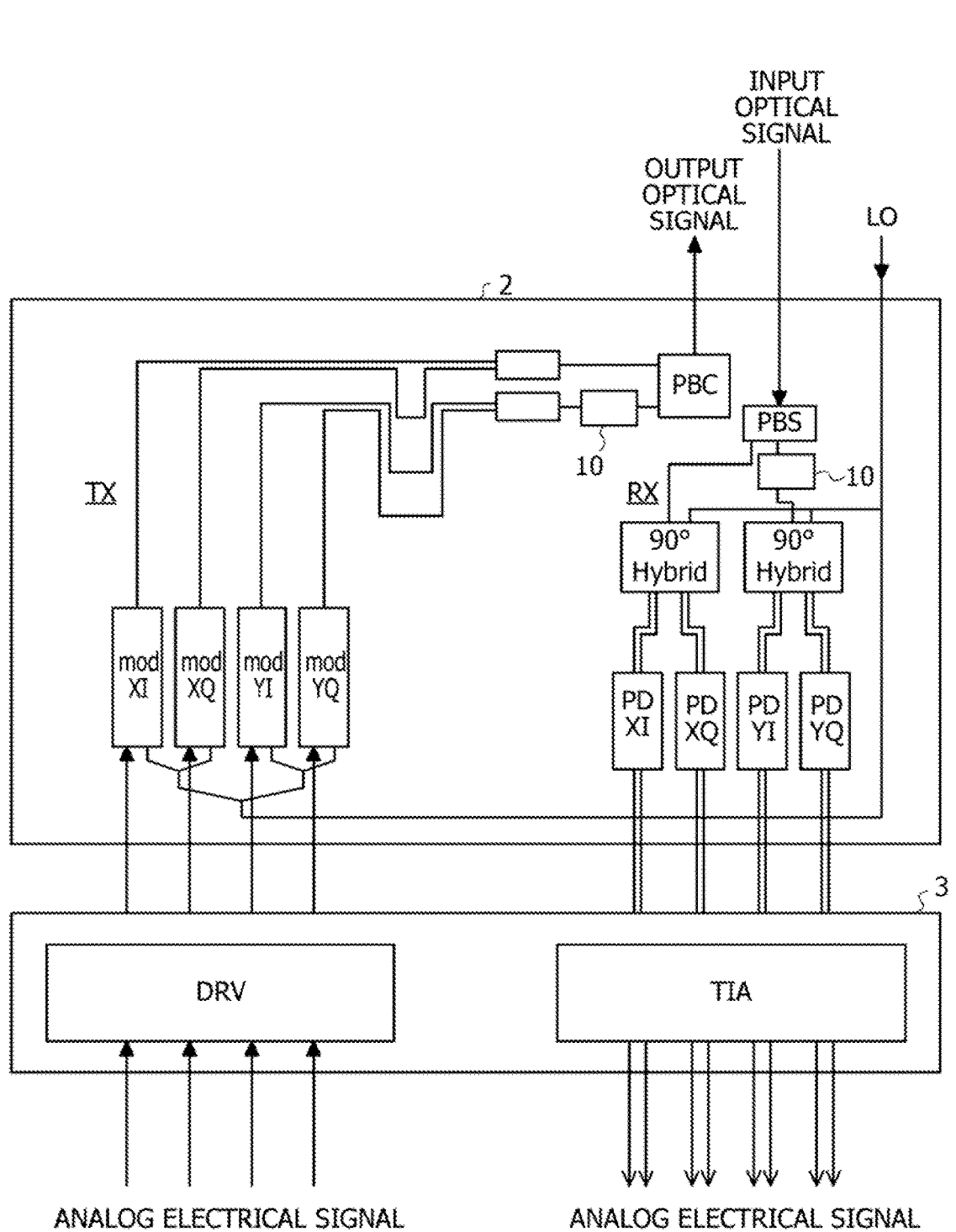
FIG. 2 is a schematic diagram of an optical transmitter/receiver to which an optical circuit element of an embodiment is applied.

FIG. 2 is a schematic diagram of an optical transmitter/receiver 1 to which an optical circuit element of an embodiment is applied. The optical transmitter/receiver 1 includes an optical integrated circuit chip 2 that is an optical-electric conversion front-end circuit. The optical transmitter/receiver 1 may include an electric circuit chip 3 connected to the optical integrated circuit chip 2.

The optical transmitter/receiver 1 is, for example, a transmitter/receiver in a dual polarization-quadrature phase shift keying (DP-QPSK) method for transmitting 4-bit information using two orthogonal polarization components and two orthogonal optical phase components.

In the optical integrated circuit chip 2, various optical elements including an optical circuit element 10 are monolithically formed on a substrate. The optical circuit element 10 is used for each of a transmitter TX and a receiver RX.

In the transmitter TX, for example, an optical signal modulated by an IQ modulator (mod YI and mod YQ) on a Y polarization side undergoes polarization rotation and polarization conversion at the optical circuit element 10. Output light of the optical circuit element 10 is combined with an optical signal modulated by an IQ modulator (mod XI and mod XQ) on an X polarization side by a polarizing beam combiner (PBC) and output.

In the receiver RX, the input optical signal is split by a polarizing beam splitter (PBS), and one of polarization components (for example, a Y polarization component) undergoes the polarization rotation and polarization conversion by the optical circuit element 10. For each split component, an I component and a Q component are extracted by interference with local emission LO with a 90° hybrid optical mixer (illustrated as "90° Hybrid" in FIG. 2). Output light from the 90° hybrid optical mixer is detected by receivers (PDXI, PDXQ, PDYI, and PDYQ).

Figure 3A:
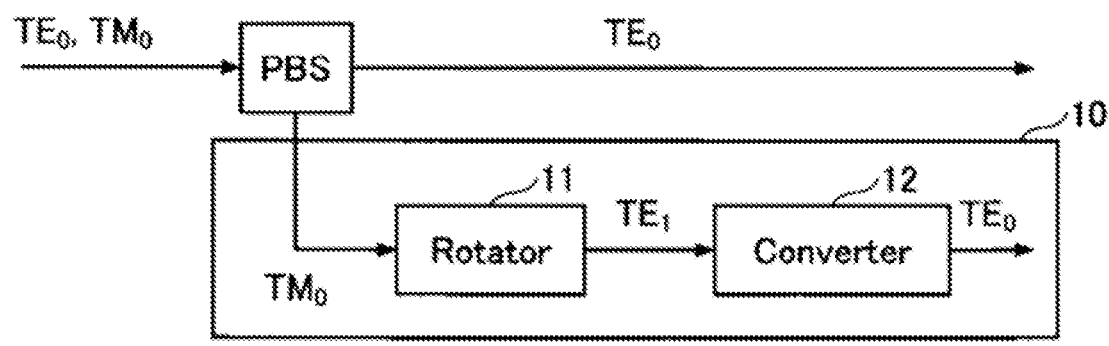
FIG. 3A is a schematic diagram of polarization rotation and mode conversion.

FIG. 3A is a schematic diagram of the polarization rotation and the polarization conversion. A polarization multiplex signal received by the optical transmitter/receiver 1 (see FIG. 2) includes a TE0 mode optical signal and a TM0 mode optical signal. The TE0 mode light separated by PBS directly enters the receiver. The TM0 mode light is converted into TE1 mode light by a polarization rotator 11 of the optical circuit element 10 and is converted into basic TE0 mode light by a polarization converter 12, and enters the receiver. This polarization rotation and polarization conversion are performed using a passive waveguide.

Figure 3B:
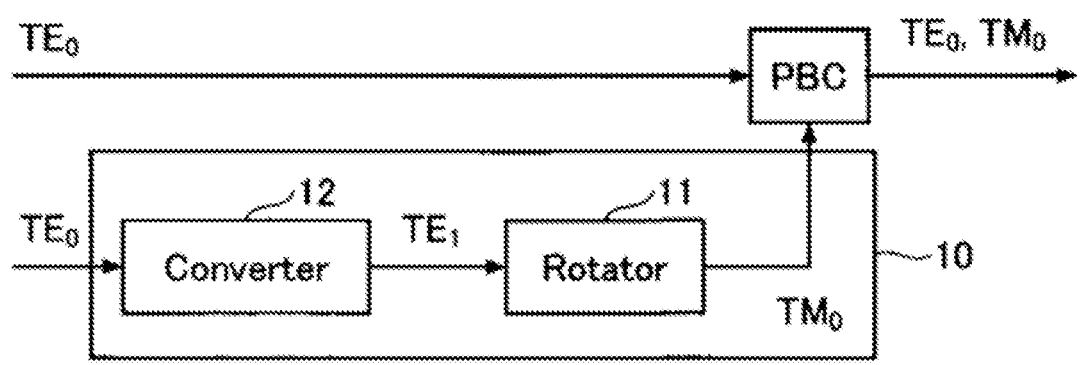
FIG. 3B is a schematic diagram of mode conversion and polarization rotation.

FIG. 3B is a schematic diagram of the polarization conversion and polarization rotation. A part of the TE0 mode modulated optical signal generated by the optical transmitter/receiver 1 is converted into the TE1 mode light by the polarization converter 12 of the optical circuit element 10 and is converted into the TM0 mode optical signal by the polarization rotator 11. The TM0 mode optical signal is combined with the remaining TE0 mode optical signal in PBC and output. This polarization conversion and polarization rotation are performed using a passive waveguide, as will be described below.

First Embodiment

Figure 4:
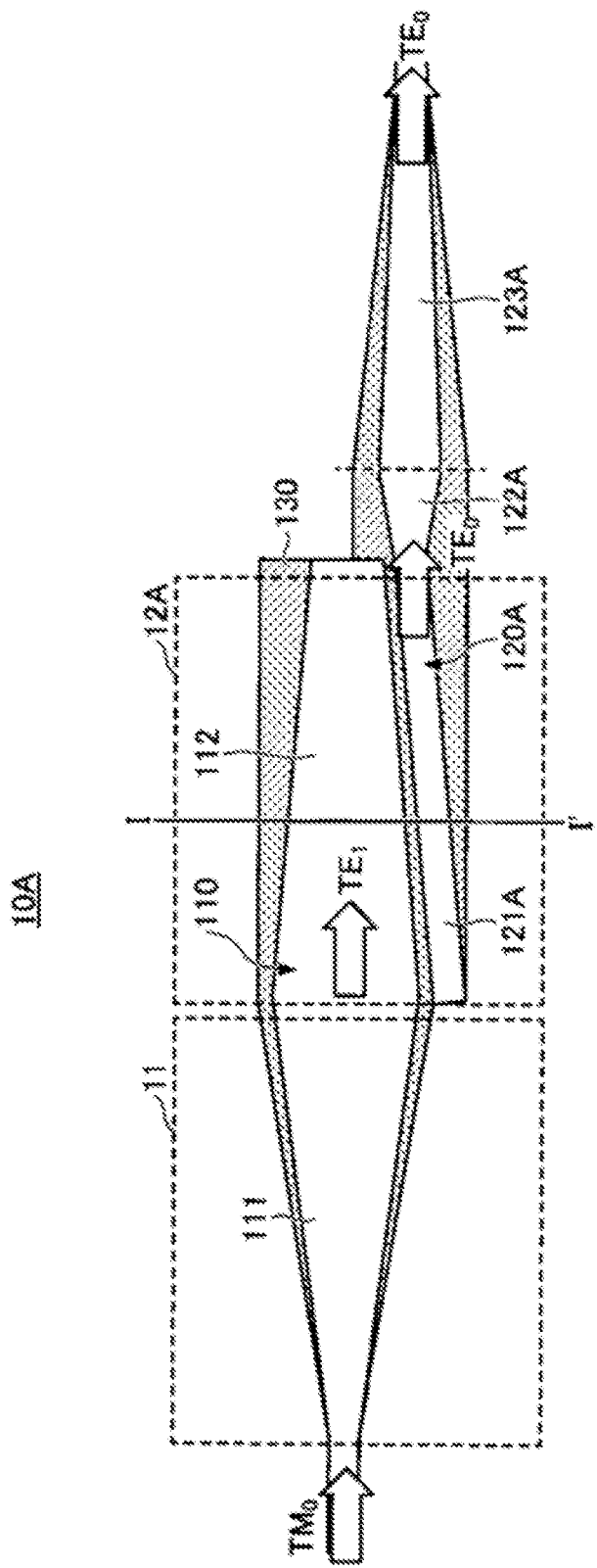
FIG. 4 is a schematic plan view of an optical circuit element of a first embodiment.
Figure 5:
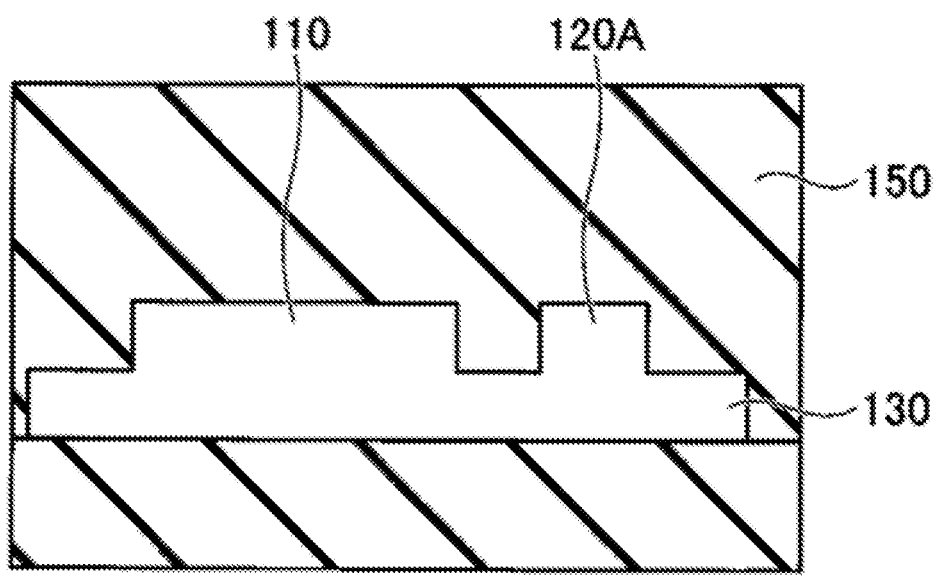
FIG. 5 is a cross-sectional view taken along line I-I' of FIG. 4.

FIG. 4 is a schematic plan view of an optical circuit element 10A of a first embodiment. FIG. 5 is a cross-sectional view taken along line I-I' of FIG. 4. The optical circuit element 10A includes a first waveguide 110 and a second waveguide 120A. As illustrated in FIG. 5, the first waveguide 110 and the second waveguide 120A are formed by a rib-shaped waveguide core having a shape in a height direction being asymmetrical with respect to a center in the height direction.

A lower part of the first waveguide 110 and the second waveguide 120A is, for example, a slab layer 130 formed using silicon, and a rib-shaped upper core formed using silicon is formed on the slab layer 130. The slab layer 130 serves as a lower core of the first waveguide 110 and the second waveguide 120A. As an example, the thickness of the slab layer 130 is 100 nm, and the thickness of the rib-shaped upper core is 220 nm.

The slab layer 30 and the rib-shaped upper core are formed by processing a layer of a core material such as silicon using an individual mask respectively. Since the first waveguide 110 and the second waveguide 120A are expected to be asymmetrical in a vertical direction, that is, in the height direction, the misalignment of the upper core with respect to the slab layer 30 does not significantly affect the polarization conversion.

The first waveguide 110 and the second waveguide 120A formed by the slab layer 130 and the upper core are surrounded by, for example, a cladding 150 of $SiO_2$ having a refractive index lower than silicon to form a vertically asymmetric waveguide core.

In FIG. 4, consider a case where light propagates from the first waveguide 110 to the second waveguide 120A side. The first waveguide 110 has a first segment 111 with a width gradually expanding with respect to incident light, and a second segment 112 continuous with the first segment 111. In this example, the width of the second segment 112 changes along a light propagation direction. Therefore, in the following description, the first segment is referred to as "first tapered waveguide 111" and the second segment 112 is referred to as "second tapered waveguide 112". The first tapered waveguide 111 is a passive waveguide that performs polarization conversion between the TM0 mode and the TE1 mode, and functions as the polarization rotator 11.

The second waveguide 120A includes a coupled waveguide 121A, a third tapered waveguide 122A with a width gradually expanding from the coupled waveguide 121A, and a fourth tapered waveguide 123A with a width gradually and continuously narrowing from the third tapered waveguide 122A.

The second tapered waveguide 112 of the first waveguide 110 and the coupled waveguide 121A of the second waveguide 120A form a directional coupler 12A asymmetrical in the width direction. In the configuration example in FIG. 4, the distance (gap) between the coupled waveguide 121A and the second tapered waveguide 112 is set in a fixed manner.

When the TM0 mode light is input to the first waveguide 110, the TM0 mode light is converted into the TE1 mode light by the first tapered waveguide 111, which is asymmetrical in the height direction. The operation of the polarization rotation by the first tapered waveguide 111 will be described with reference to FIG. 6.

Figure 6:
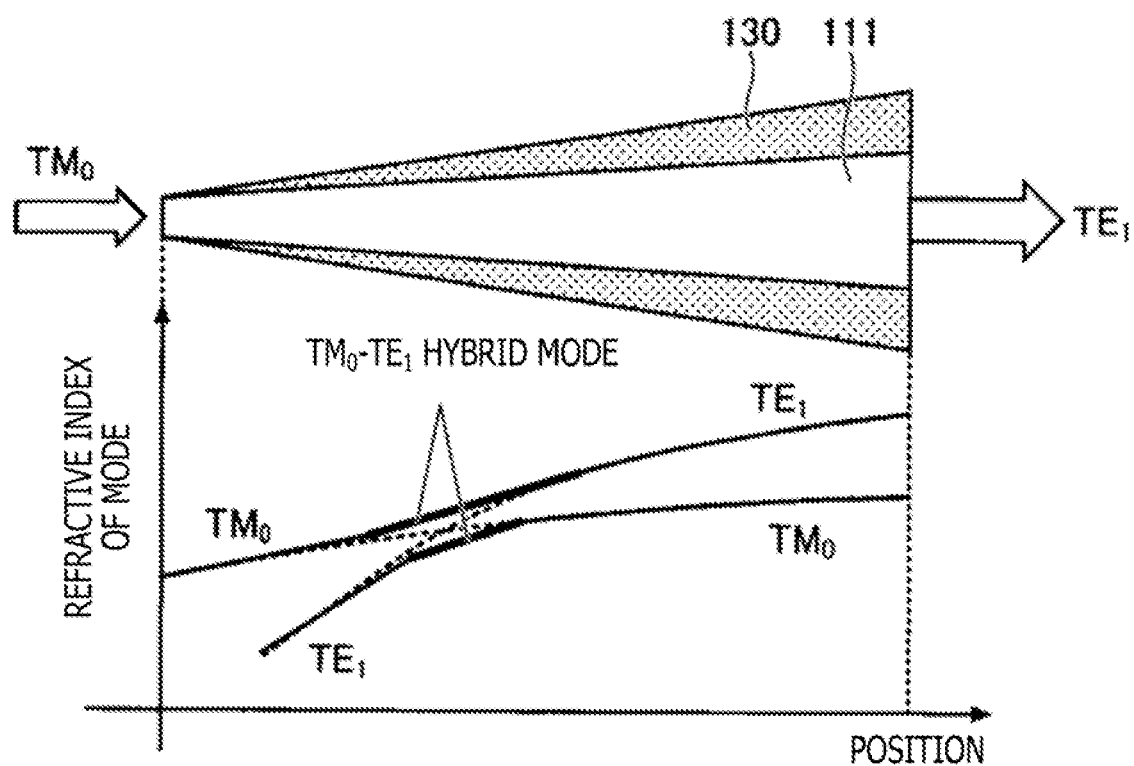
FIG. 6 is a diagram illustrating an operation of polarization rotation.

FIG. 6 illustrates the refractive indexes of the TM0 mode and the TE1 mode as a function of the position of the first tapered waveguide 111 in a length direction. A left-end origin is an incident position. The width of the first tapered waveguide 111 increases from the incident position along the length direction or the light propagation direction.

At the incident position of the first tapered waveguide 111, the effective refractive index in the TM0 mode is higher than the effective refractive index in the TE1 mode. At a termination of the first tapered waveguide 111, the effective refractive index in the TE1 mode is higher than the effective refractive index in the TM0 mode. The effective refractive index in the TM0 mode, in which only a magnetic field oscillates in a cross section orthogonal to the light propagation direction, changes little regardless of the position in the length direction of the first tapered waveguide 111. On the other hand, the effective refractive index in the TE1 mode, in which only an electric field oscillates in a cross section orthogonal to the light propagation direction, changes significantly from the incident position of the first tapered waveguide 111 toward the termination.

In the first tapered waveguide 111 in which the symmetry in the height direction collapses, the magnitude relation between the effective refractive indexes in the TM0 mode and in the TE1 mode is switched near the center in the length direction. This area has a TM0-TE1 hybrid mode in which no separate TM0 mode and TE1 mode are present. Polarization conversion is adiabatically performed using the coupling of the TM0 mode and the TE1 mode.

Returning to FIG. 4, a polarized wave converted into the TE1 mode by the first tapered waveguide 111 is coupled from the second tapered waveguide 112 to the coupled waveguide 121A of the second waveguide 120A. As described above, the second tapered waveguide 112 of the first waveguide 110 and the coupled waveguide 121A of the second waveguide 120A form the directional coupler 12A asymmetrical in the height direction and in the width direction, as an example of the polarization converter 12.

As a characteristic of the first embodiment, the width of the second tapered waveguide 112 of the first waveguide 110 changes along the light propagation direction. In the case where the light propagates from the left side on the paper, that is, from the first tapered waveguide 111 side, the width of the second tapered waveguide 112 decreases along the light propagation direction. By changing the width of the waveguide forming the directional coupler 12A in the length direction, the influence of fluctuations in the waveguide width due to manufacturing errors or the like is reduced and the tolerance for the manufacturing errors is increased in the asymmetric directional coupler. The significance of this configuration will be described with reference to FIG. 7.

Figure 7:
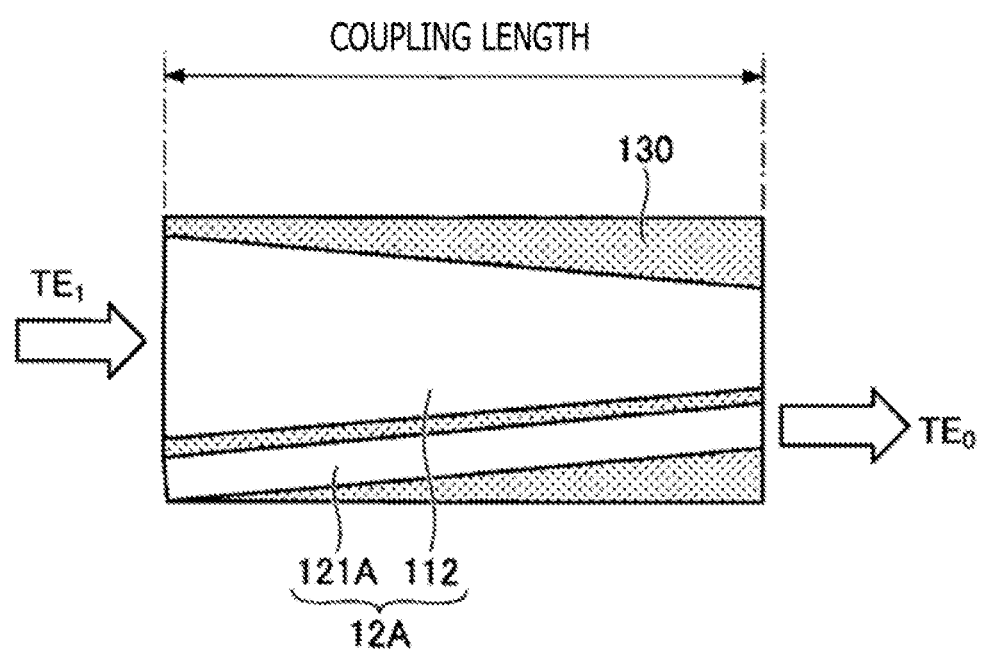
FIG. 7 is a diagram for describing conversion between TE0 mode and TE1 mode in a directional coupler.

FIG. 7 is a diagram for describing conversion between the TE0 mode and the TE1 mode in the directional coupler 12A. The coupling length of the directional coupler 12A is designed to be an optimum value such that the difference between the effective refractive index perceived by the TE1 mode light propagating through the second tapered waveguide 112 and the effective refractive index perceived by the TE0 mode light propagating through the coupled waveguide 121A is minimized.

In the case of using waveguides with a fixed width as two waveguides forming the asymmetric directional coupler 12A, the effective refractive index in each mode changes when the waveguide width fluctuates from the design value due to manufacturing errors or the like (see FIG. 11). However, since the coupling length is determined to be a predetermined value, the conversion efficiency decreases by the amount of change in the effective refractive index of each mode due to the manufacturing errors.

In contrast, by changing the width of the second tapered waveguide 112 along the propagation direction as in FIG. 7, for example, there is a point at which the effective refractive index in the TE1 mode and the effective refractive index in the TE0 mode coincide or intersect with each other, the point being any position in the length direction, even if the waveguide width deviates from the design value. The TE1 mode light is coupled to the coupled waveguide 121A of the second waveguide 120A with the maximum efficiency as the TE0 mode light at the point where the difference in effective refractive index between the TE0 mode and the TE1 mode is minimized.

A taper angle of the second tapered waveguide 112 is set to compensate for the change in the effective refractive index in the TE1 mode due to the width fluctuation, within a range of assumed manufacturing errors. According to a calculation result, there is a point at which the effective refractive index in the TE1 mode of the first waveguide 110 and the effective refractive index in the TE0 mode of the second waveguide 120A coincide or intersect with each other within a range up to 1 µm in the length direction from a starting point of the second tapered waveguide 112 of the first waveguide 110. Thereby, the tolerance for the manufacturing errors of the asymmetric directional coupler is improved, and the conversion efficiency or the transmission characteristics may be highly maintained.

Returning to FIG. 4, the light propagating through the coupled waveguide 121A of the second waveguide 120A passes through the third tapered waveguide 122A and is output through the fourth tapered waveguide 123A as the TE0 mode light. As another characteristic of the embodiment, the fourth tapered waveguide 123A functions as a cut filter for unnecessary polarization components (for example, the TM0 component).

As illustrated in FIG. 4, there is a possibility that part of the TE1 mode light converted from the TM0 mode light is inversely converted into the TM0 mode when the waveguide width of the second tapered waveguide 112 forming the directional coupler 12A is designed to change in an opposite direction to the waveguide width of the first tapered waveguide 111. When the TM0 component is mixed in the light coupled to the coupled waveguide 121A, the polarization extinction ratio deteriorates, and the transmission characteristics of the output light deteriorate. To solve the above problem, the fourth tapered waveguide 123A is tapered to remove the TM0 component and improve the polarization extinction ratio.

Figure 8:
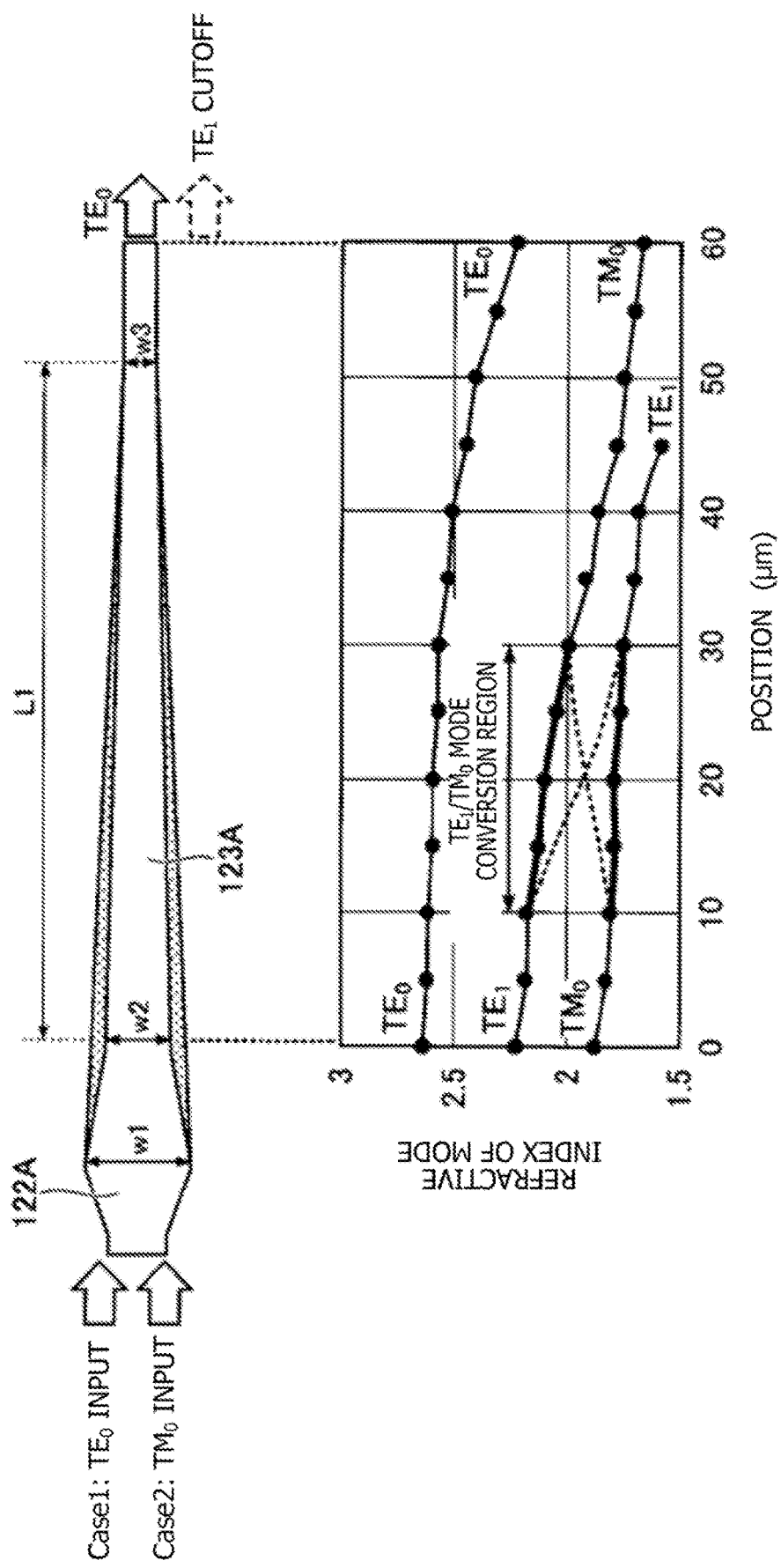
FIG. 8 is a diagram illustrating a configuration and a function of a TM0 cut filter.

FIG. 8 is a diagram for describing a TM0 removal effect of the fourth tapered waveguide 123A. FIG. 8 illustrates planar shapes of the third tapered waveguide 122A and the fourth tapered waveguide 123A, and positional dependency of the refractive index of each propagation mode.

As illustrated in the drawing of the positional dependency of the refractive index, in the second waveguide 120A, the waveguide width is widened to w1 by the third tapered waveguide 122A before reaching the fourth tapered waveguide 123A and is narrowed to w3 in a light traveling direction. Since the waveguide width w3 is set to the width at which the TE1 mode is cut, the mode converted from the TM0 to the TE1 by the fourth tapered waveguide 123A is cut in the waveguide portion with the width w3, and the TM0 mode component having entered the third tapered waveguide 122A is not output. For the above reasons, the fourth tapered waveguide 123A can be caused to appropriately function as the TM0 cut filter at the starting point of the fourth tapered waveguide 123A.

As an example, the width w1 of an end point of the third tapered waveguide 122A, that is, a starting point of the fourth tapered waveguide 123A is 1.6 µm, a width w2 of a starting point of the TM0 cut filter is 0.65 µm, and the width w3 of an end point of the TM0 cut filter is 0.4 µm. A length L1 of the TM0 cut filter with the waveguide width changing from w2 to w3 is 60 µm.

Looking at the positional dependency of the refractive index of each propagation mode, the difference in refractive index of the target TE0 mode light from other propagation modes is large, and is thus not coupled to other modes and propagates through the fourth tapered waveguide 123A as it is. As illustrated in "Case1" in FIG. 8, the TE0 mode light that passes from the coupled waveguide 121 through the third tapered waveguide 122A and enters the fourth tapered waveguide 123A is output through the fourth tapered waveguide 123A as the TE0 mode light.

In contrast, in the TE1 mode and the TM0 mode, the refractive indexes of the modes approach each other in the range of 10 to 30 μm from the starting point of the TM0 cut filter, and the symmetry in the height direction collapses in the cross-sectional shape of the fourth tapered waveguide 123A. Therefore, coupling between the TE1 mode and the TM0 mode occurs.

As in "Case2" in FIG. 8, when the TM0 mode light enters the third tapered waveguide 122A, the TM0 mode light is converted into the TE1 mode light by the coupling in the fourth tapered waveguide 123A, but the TE1 mode falls in a cutoff condition at the position of the waveguide width w3 and is removed. In this sense, the TM0 cut filter may be called "TE1 cut filter".

Meanwhile, in a case where the TE1 mode light enters the fourth tapered waveguide 123A, the TE1 mode light is output as the TM0 mode light. However, since the fourth tapered waveguide 123A is connected to a subsequent stage of the asymmetric directional coupler 12A that converts the TE1 mode into the TE0 mode, the TE1 mode light is rarely input to the fourth tapered waveguide 123A in practice. Even if a TE1 component is slightly generated from the TM0 component in the part where the waveguide width of the third tapered waveguide 122A is widened to the width w1, the amount of generated TE1 component is negligibly small.

Even if the TM0 component is mixed in the light to be coupled to the second waveguide 120A in the directional coupler 12A, the TM0 component is removed by the TM0 cut filter by the configuration of the fourth tapered waveguide 123A. Therefore, the polarization extinction ratio between TE0 and TM0 is improved.

Figures 9A, 9B:
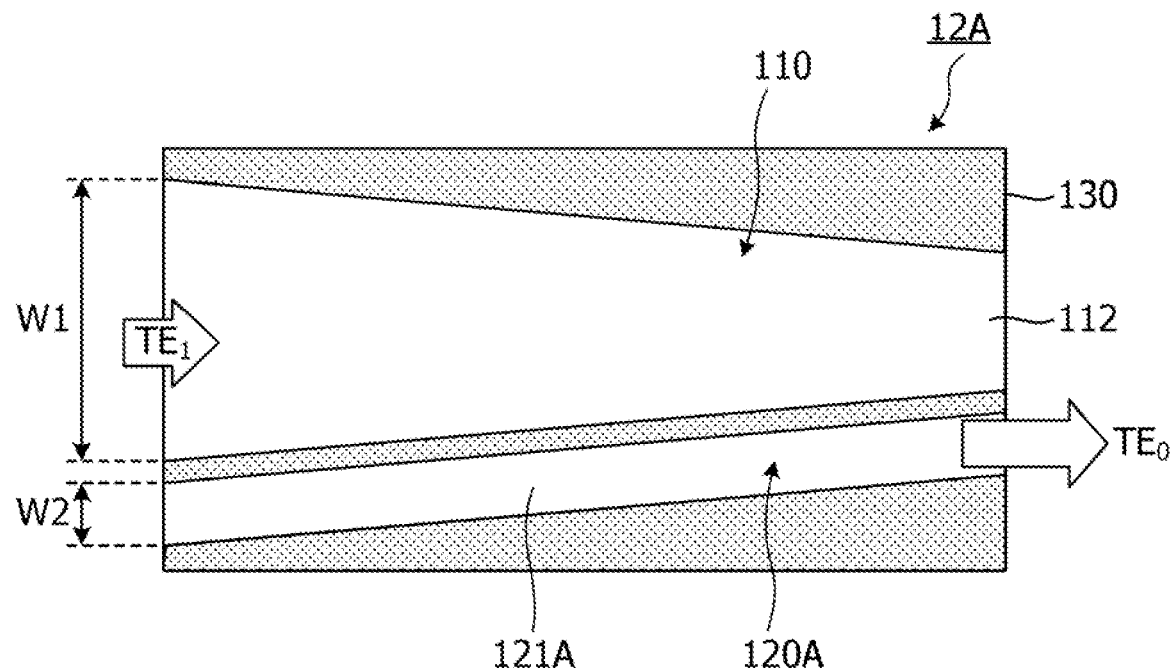
FIG. 9A is diagram illustrating effect of improving tolerance for manufacturing errors and a polarization extinction ratio of the configuration of the first embodiment.
FIG. 9B is diagram illustrating effect of improving tolerance for manufacturing errors and a polarization extinction ratio of the configuration of the first embodiment.

FIGS. 9A and 9B are diagrams illustrating effect of improving the tolerance for manufacturing errors and the polarization extinction ratio according to the first embodiment. FIG. 9A is a schematic diagram of the directional coupler 12A of the optical circuit element 10A of the first embodiment, and FIG. 9B is a two-dimensional map of the transmission intensity of the TE0 mode. In FIG. 9A, the waveguide width at the starting point of the taper of the first waveguide 110 is W1. The width of the first waveguide 110 gradually narrows from W1 along the propagation direction. The transmission intensity of when the light incident in the TE1 mode is output as the TE0 mode light is calculated by the finite difference time domain (FDTD) method. What kind of loss occurs at an optimum coupling point of the first waveguide 110 (for example, a point of an optimum design width 0.7 μm in FIG. 1) when the width W1 at the taper starting point of the first waveguide 110 and the width W2 of the second waveguide 120A deviate is mapped. The calculation is performed on the assumption that the distance between the first waveguide 110 and the second waveguide 120A is 150 nm.

The attenuation under the center condition (at the point where W1=0.8 μm is narrowed to 0.7 μm and W2=0.33 μm) is 0 dB. Each of the width W1 and the width W2 is changed in 25-nm increments within a range of ±50 nm from the center condition without changing a pitch (center distance), similarly to FIGS. 1A to 1C.

Compared with FIG. 1C, the attenuation decreases and the transmission characteristics are greatly improved even if the condition deviates from the center condition. Even if only the width of either the first waveguide 110 or the second waveguide 120A deviates from the design value even at the four corners of the table farthest from the center condition, the coupling loss from TE1 to TE0 is effectively suppressed.

Second Embodiment

FIG. 10 is a schematic plan view of an optical circuit element 10B of a second embodiment. The optical circuit element 10B includes a first waveguide 110 and a second waveguide 120B. Consider a case in which light is coupled from the first waveguide 110 to the second waveguide 120B side.

The first waveguide 110 is the same as the first waveguide 110 of the first embodiment, and includes a first tapered waveguide 111 with a width gradually expanding with respect to incident light, and a second tapered waveguide 112 with a width gradually changing from the first tapered waveguide 111.

The second waveguide 120B includes a coupled waveguide 121B optically coupled to the first waveguide 110 and a fourth tapered waveguide 123B with a width continuously narrowing from the coupled waveguide 121B. Although not illustrated, a third tapered waveguide having a variable waveguide width may be inserted between the coupled waveguide 121B and the fourth tapered waveguide 123B as in the first embodiment.

The coupled waveguide 121B of the second waveguide 120B forms an asymmetric directional coupler 12B in a horizontal direction and a height direction together with the second tapered waveguide 112 of the first waveguide 110. The fourth tapered waveguide 123B functions as a cut filter for unnecessary polarization components (for example, a TM0 component).

Cross-sectional shapes of the first waveguide 110 and the second waveguide 120B in the directional coupler 12B form a rib-shaped waveguide on a slab layer 130, and is surrounded by a cladding of $SiO_2$ or the like, similarly to the cross-sectional view in FIG. 5.

The first tapered waveguide 111 of the first waveguide 110 is a passive waveguide that performs polarization conversion between a TM0 mode and a TE1 mode, and functions as a polarization rotator 11. A magnitude relationship between an effective refractive index of the TM0 mode and an effective refractive index of the TE1 mode is switched near a center in a length direction of the first tapered waveguide 111, and the polarization conversion is adiabatically performed using coupling of the TM0 mode and the TE1 mode.

A polarized wave converted into the TE1 mode by the first tapered waveguide 111 is coupled from the second tapered waveguide 112 to the coupled waveguide 121B of the second waveguide 120B in the directional coupler 12B.

The width of the second tapered waveguide 112 of the first waveguide 110 continuously changes along a light propagation direction. By making the waveguide width variable in the length direction, an influence of manufacturing errors in the asymmetric directional coupler is absorbed, and tolerance for the manufacturing errors is increased.

The width of the coupled waveguide 121B of the second waveguide 120B continuously changes along the light propagation direction. By making the width of the coupled waveguide 121B variable, the influence of manufacturing errors is absorbed and the maximum conversion efficiency may be implemented even in a case where different manufacturing errors occur in the waveguide width of the first waveguide 110 and the second waveguide 120B respectively.

The distance between the second tapered waveguide 112 and the coupled waveguide 121B is designed such that the effective refractive index perceived by TE1 mode light propagating through the second tapered waveguide 112 and the effective refractive index perceived by TE0 mode light propagating through the coupled waveguide 121B become the same. With the change in the widths of the second tapered waveguide 112 and the coupled waveguide 121B, the distance between these two waveguides may change in the propagation direction.

There is a point at which the effective refractive index in the TE1 mode and the effective refractive index in the TE0 mode coincide or intersect with each other, the point being any position in the length direction, even if both the width of the second tapered waveguide 112 and the width of the coupled waveguide 121B deviate from design values due to the manufacturing errors. The TE1 mode light of the first waveguide 110 is coupled to the coupled waveguide 121B of the second waveguide 120B with the maximum efficiency as the TE0 mode light at the point where the difference in effective refractive index between the TE0 mode and the TE1 mode is minimized.

The TE mode light is output from the coupled waveguide 121B through the fourth tapered waveguide 123B. The width on an output side of the fourth tapered waveguide 123B is set to satisfy a cutoff condition for the TE1 mode.

Even in a case where a TM0 component is mixed in coupling light to the coupled waveguide 121B due to the change in the width of the second tapered waveguide 112, the TM0 component is converted into the TE1 mode by the fourth tapered waveguide 123B, and a TE component can be removed. Thereby, a polarization extinction ratio between TE0 and TM0 is improved.

Figures 11A, 11B:
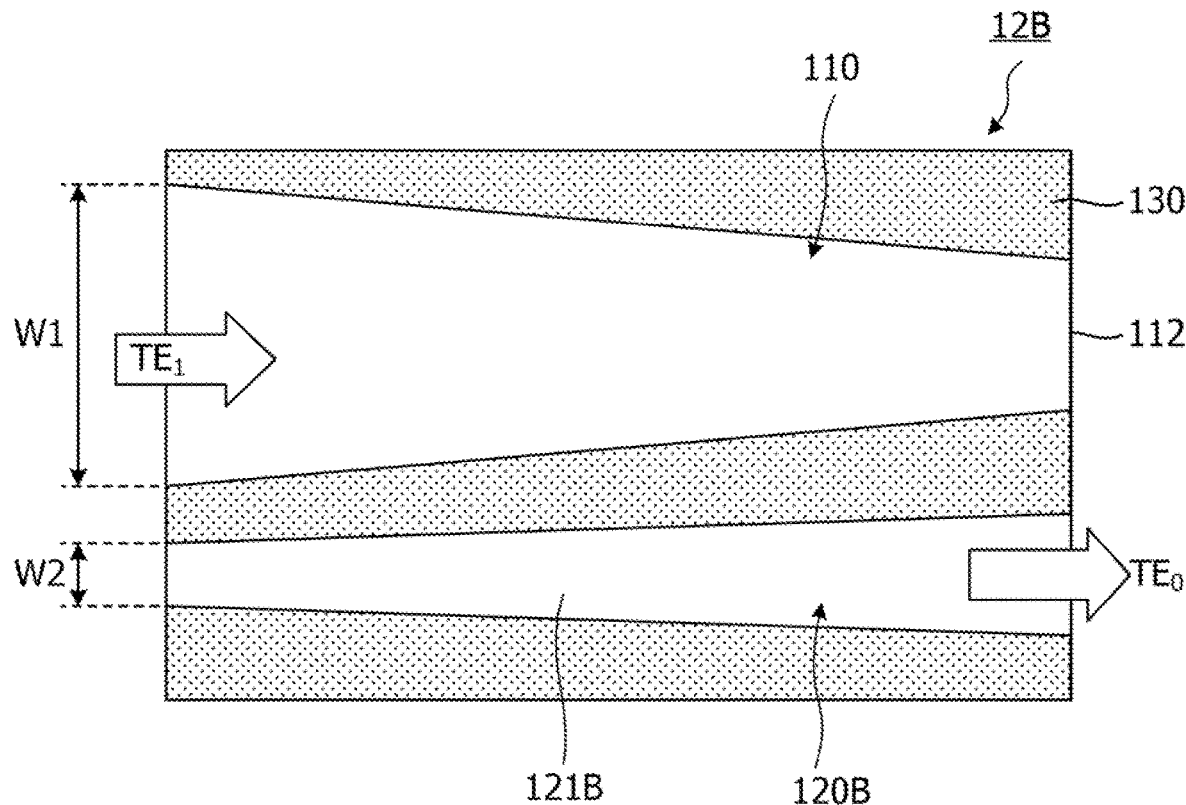
FIG. 11A is diagram illustrating effect of improving tolerance for manufacturing errors and a polarization extinction ratio of a configuration of the second embodiment.

FIGS. 11A and 11B are diagrams illustrating effect of improving the tolerance for manufacturing errors and the polarization extinction ratio of the asymmetric directional coupler according to the second embodiment. FIG. 11A is a schematic diagram of the directional coupler 12B of the optical circuit element 10B of the second embodiment, and FIG. 11B is a two-dimensional map of transmission intensity of the TE0 mode. The transmission intensity of when the light incident in the TE1 mode is output as the TE0 mode light is calculated by a finite difference time domain (FDTD) method. The width of a starting point of taper of the first waveguide 110 is W1, and the width of a starting point of taper of the second waveguide 120B is W2. Deviation from a center condition of when the width W1 of the first waveguide 110 is gradually narrowed in the propagation direction and the width W2 of the second waveguide 120B is gradually widened in the propagation direction is mapped. A calculation is performed on the assumption that an average distance between the first waveguide WG1 and the second waveguide WG2 is 150 nm.

An attenuation under the center condition (optical coupling by the directional coupler when W1 is decreased from 0.725 μm and W2 is increased from 0.28 μm) is 0 dB. The average distance between the adjacent waveguides is set to 150 nm, and each of the width W1 and the width W2 is changed in 25-nm increments within a range of ±50 nm from the center condition.

Compared with FIG. 1C, the attenuation decreases and the transmission characteristics are greatly improved even if the condition deviates from the center condition. In a range of ±25 nm from the center condition, there is almost no attenuation or coupling loss regardless of a direction in which the waveguide width deviates, and the transmission characteristics are significantly high.

Third Embodiment

FIG. 12 is a schematic plan view of an optical circuit element 10C of a third embodiment. The optical circuit element 10C includes a first waveguide 110 and a second waveguide 120C. Consider a case in which light is coupled from the first waveguide 110 to the second waveguide 120C side.

The first waveguide 110 is the same as the first waveguide 110 of the first and second embodiments, and includes a first tapered waveguide 111 with a width gradually expanding with respect to incident light, and a second tapered waveguide 112 with a width gradually changing from the first tapered waveguide 111.

The second waveguide 120C includes a coupled waveguide 121C with a width gradually expanding along a propagation direction, a third tapered waveguide 122C with a width continuously expanding from the coupled waveguide 121C, and a fourth tapered waveguide 123C with a width gradually and continuously narrowing from the third tapered waveguide 122C.

The coupled waveguide 121C forms an asymmetric directional coupler 12C in a horizontal direction and a height direction together with the second tapered waveguide 112 of the first waveguide 110. The fourth tapered waveguide 123C functions as a cut filter for unnecessary polarization components (for example, a TM0 component).

Cross-sectional shapes of the first waveguide 110 and the second waveguide 120C in the directional coupler 12C form a rib-shaped waveguide on a slab layer 130, and is surrounded by a cladding of $SiO_2$ or the like, similarly to the cross-sectional view in FIG. 5.

The first tapered waveguide 111 of the first waveguide 110 is a passive waveguide that performs polarization conversion between a TM0 mode and a TE1 mode, and functions as a polarization rotator 11. A magnitude relationship between an effective refractive index of the TM0 mode and an effective refractive index of the TE1 mode is switched near a center in a length direction of the first tapered waveguide 111, and the polarization conversion is adiabatically performed using coupling of the TM0 mode and the TE1 mode.

A polarized wave converted into a TE1 mode by the first tapered waveguide 111 is coupled from the second tapered waveguide 112 to the coupled waveguide 121C of the second waveguide 120C in the directional coupler 12C.

The width of the second tapered waveguide 112 of the first waveguide 110 continuously changes along a light propagation direction. By making the waveguide width variable in the length direction, an influence of manufacturing errors or the like in the asymmetric directional coupler is reduced, and tolerance for the manufacturing errors is increased.

The width of the coupled waveguide 121C of the second waveguide 120C continuously changes along the light propagation direction. By changing the width of the coupled waveguide 121C along the light propagation direction, the influence of manufacturing errors is absorbed, variations among each of products are suppressed, and the maximum conversion efficiency may be implemented, even in a case where the manufacturing errors occur both in the first waveguide 110 and the second waveguide 120B respectively.

A width change in the second tapered waveguide 112 and a width change in the coupled waveguide 121C are designed such that the effective refractive index perceived by TE1 mode light propagating through the second tapered waveguide 112 and the effective refractive index perceived by TE0 mode light propagating through the coupled waveguide 121C become the same. In this example, the distance between the second tapered waveguide 112 and the coupled waveguide 121C is fixed.

There is a point at which the effective refractive index in the TE1 mode of the first waveguide 110 and the effective refractive index in the TE0 mode of the second waveguide 120C coincide or intersect with each other, the point being any position in the length direction, even if both the width of the second tapered waveguide 112 and the width of the coupled waveguide 121C deviate from design values due to the manufacturing errors. The TE1 mode light is coupled to the coupled waveguide 121C of the second waveguide 120C with the maximum efficiency as the TE0 mode light at the point where the difference in effective refractive index between the TE0 mode and the TE1 mode is minimized.

The TE mode light is output from the coupled waveguide 121C through the third tapered waveguide 122C and the fourth tapered waveguide 123C. The width on an output side of the fourth tapered waveguide 123C is set to satisfy a cutoff condition for the TE1 mode. The width at a starting point of the third tapered waveguide 122C coincides with the width of an end point of the coupled waveguide 121C. The width of an end point of the third tapered waveguide 122C accords with the width of a starting point of the fourth tapered waveguide 123C designed to properly remove the TM0 mode.

Even in a case where a TM0 component is mixed in coupling light to the coupled waveguide 121C due to the change in the width of the second tapered waveguide 112, the TM0 component is converted into the TE1 mode by the fourth tapered waveguide 123C, and a TE1 component can be removed. Thereby, a polarization extinction ratio between TE0 and TM0 is improved.

Figure 13A:
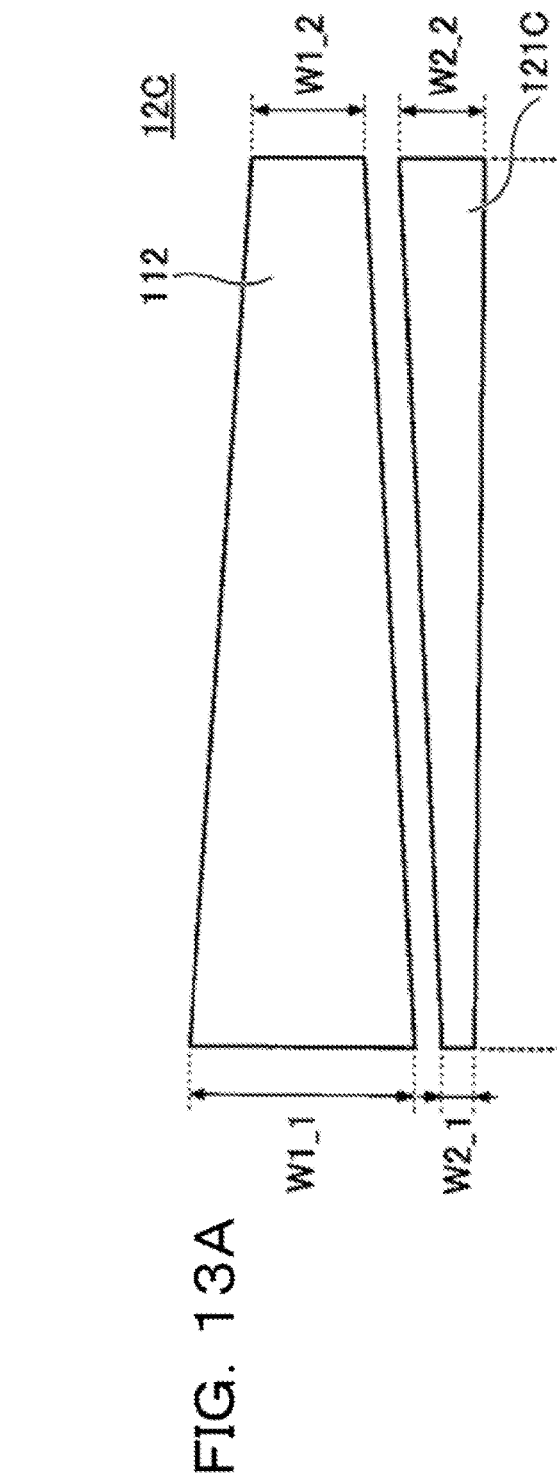
FIG. 13A is diagram for describing conversion between TE0 mode and TE1 mode in a directional coupler of the third embodiment.
Figure 13B:
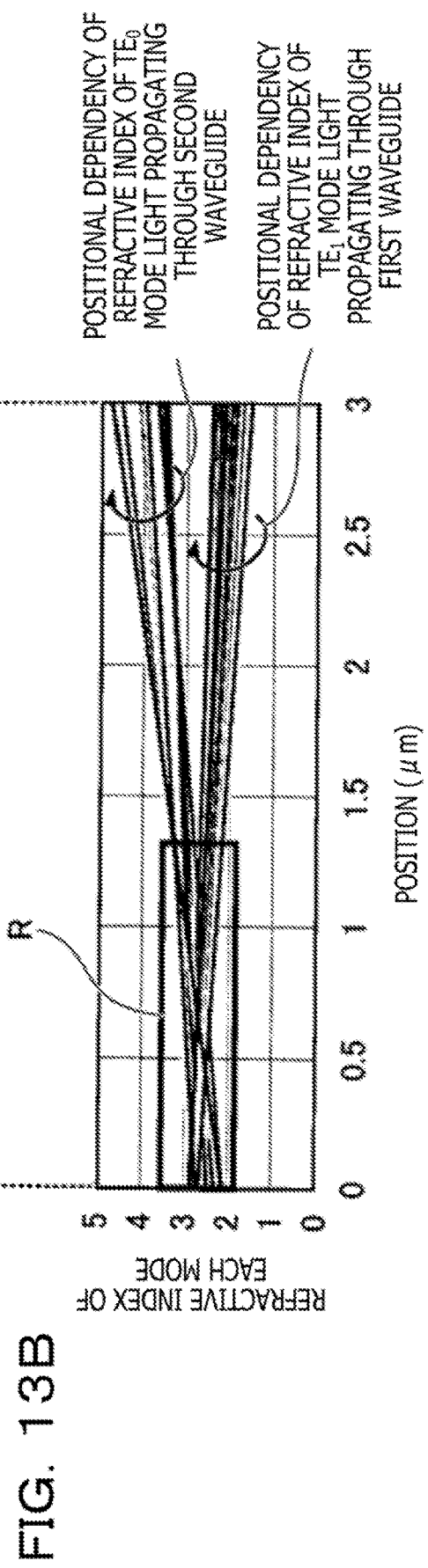
FIG. 13B is diagram for describing conversion between TE0 mode and TE1 mode in a directional coupler of the third embodiment.

FIGS. 13A and 13B are diagrams for describing conversion between the TE1 mode and the TE0 mode in the directional coupler 12C. FIG. 13A illustrates a schematic plan view of the directional coupler 12C and FIG. 13B illustrates positional dependency of the refractive index in each mode.

In FIG. 13A, a width W1_1 at the starting point of the second tapered waveguide 112 of the first waveguide 110 forming the directional coupler 12C is designed to be 0.725 μm, and a width W1_2 at the termination is designed to be 0.645 μm. Furthermore, a width W2_1 at the starting point of the coupled waveguide 121C of the second waveguide 120C is designed to be 0.28 μm, and a width W2_2 at the termination is designed to be 0.36 μm.

FIG. 13B illustrates all the refractive indexes of when W1_1, W1_2, W2_1, and W2_2 are changed in a range of ±50 nm in a superimposed manner respectively. The effective refractive index perceived by the TE1 mode light propagating through the second tapered waveguide 112 of the first waveguide 110 intersects with the effective refractive index perceived by the TE0 mode light propagating through the coupled waveguide 121C of the second waveguide 120C in a region R up to 1.3 μm from the starting point of the directional coupler 12C.

Note that the point at which the refractive index perceived by the TE1 mode light propagating through the first waveguide 110 coincides with the refractive index perceived by the TE0 mode light propagating through the second waveguide 120C is present under any waveguide width condition in the region R. By tapering the planar shapes of both the second tapered waveguide 112 and the coupled waveguide 121C, the point at which the refractive index of TE1 coincides with the refractive index of TE0 is present even if one or both of the waveguide widths deviate due to manufacturing errors or the like.

Thereby, the tolerance for the manufacturing errors of the asymmetric directional coupler is improved, and the conversion efficiency may be highly maintained.

Other Configuration Examples

Figure 14:
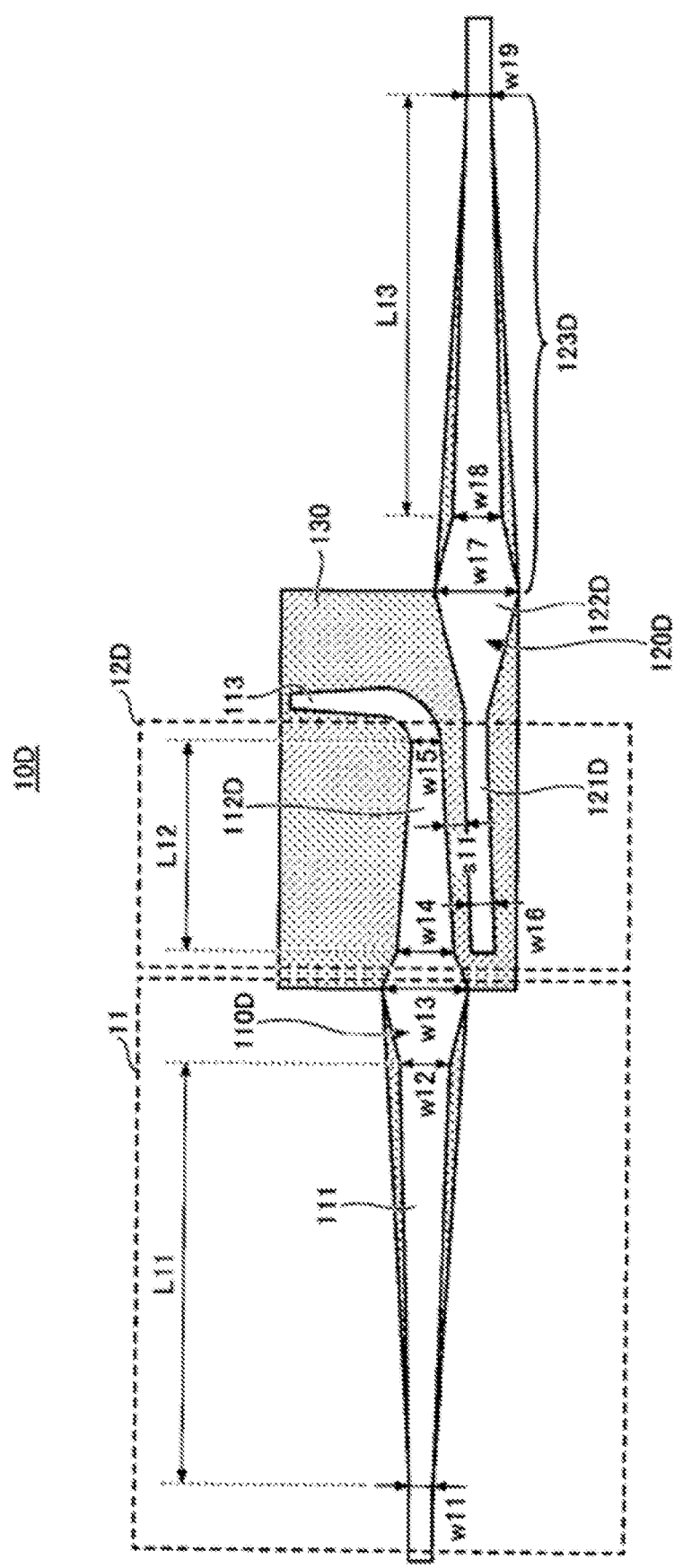
FIG. 14 is a view illustrating a configuration of a modification.

FIG. 14 illustrates a specific configuration of an optical circuit element 10D as still another configuration example. The optical circuit element 10D includes a first waveguide 110D and a second waveguide 120D.

The first waveguide 110D includes a first tapered waveguide 111, a second tapered waveguide 112D, and a curved waveguide 113. The first tapered waveguide 111 functions as a polarization rotator 11. The curved waveguide 113 functions as an optical terminator.

The second waveguide 120D includes a coupled waveguide 121D, a third tapered waveguide 122D, and a fourth tapered waveguide 123D. The coupled waveguide 121D forms an asymmetric directional coupler 12D together with the second tapered waveguide 112D of the first waveguide 110D. The fourth tapered waveguide 123D functions as a cut filter for unnecessary polarization components (for example, a TM0 component).

The first waveguide 110D and the second waveguide 120D are height-asymmetric waveguides having a rib waveguide formed on a slab layer 130. The thickness of the slab layer 130 and the height of a waveguide core are appropriately designed. As an example, the height of the rib waveguide (upper core) is 0.22 μm, and the thickness of the slab layer 130 is 0.1 μm.

Consider a case where light propagates from the first waveguide 110D to the second waveguide 120D side. As one design example, a width w11 on an input side of the first tapered waveguide 111 of the first waveguide 110D is 0.4 μm. The width is once widened to a width w12 of 0.65 μm with a taper length L11 of 60 μm, and a taper angle is then increased and widened up to a width w13 of 1.6 μm. In a tapered region between w11 and w12, TM0 mode and TE1 mode conversion is performed.

The first tapered waveguide 111 with the extended width is connected as the second tapered waveguide 112D to the asymmetric directional coupler 12D. In the directional coupler 12D, the first waveguide 110D and the second waveguide 120D are asymmetrical with each other in a width direction.

The second tapered waveguide 112D is narrowed to a width w14 of 0.78 μm, then narrowed with a gentle taper, and narrowed up to a width w15 of 0.57 μm. A taper length L12 is 8 μm. In a tapered region between w14 and w15, an influence of deviation in the waveguide width due to manufacturing errors or the like is absorbed.

A curved waveguide 113 is formed following the second tapered waveguide 112D. The curved waveguide 113 is curved in a direction away from the second waveguide 120D and has a tapered shape. This is to reduce unintended reflections.

In the asymmetric directional coupler 12D, a distance s11 between the second tapered waveguide 112D of the first waveguide 110D and the coupled waveguide 121D of the second waveguide 120D is 0.15 µm, which is fixed. A width w16 of the coupled waveguide 121D is set to a fixed value of 0.33 µm.

The coupled waveguide 121D is extended to a width w17 of 1.6 µm by the third tapered waveguide 122D and is connected to the fourth tapered waveguide 123D. In the fourth tapered waveguide 123D, the waveguide width is narrowed to a width w18 of 0.65 µm, and is then gently tapered up to a width w19 of 0.4 µm. A taper length L13 in a region from w18 to w19 is 60 µm. This tapered region functions as a cut filter that removes unnecessary polarization components.

Figure 15:
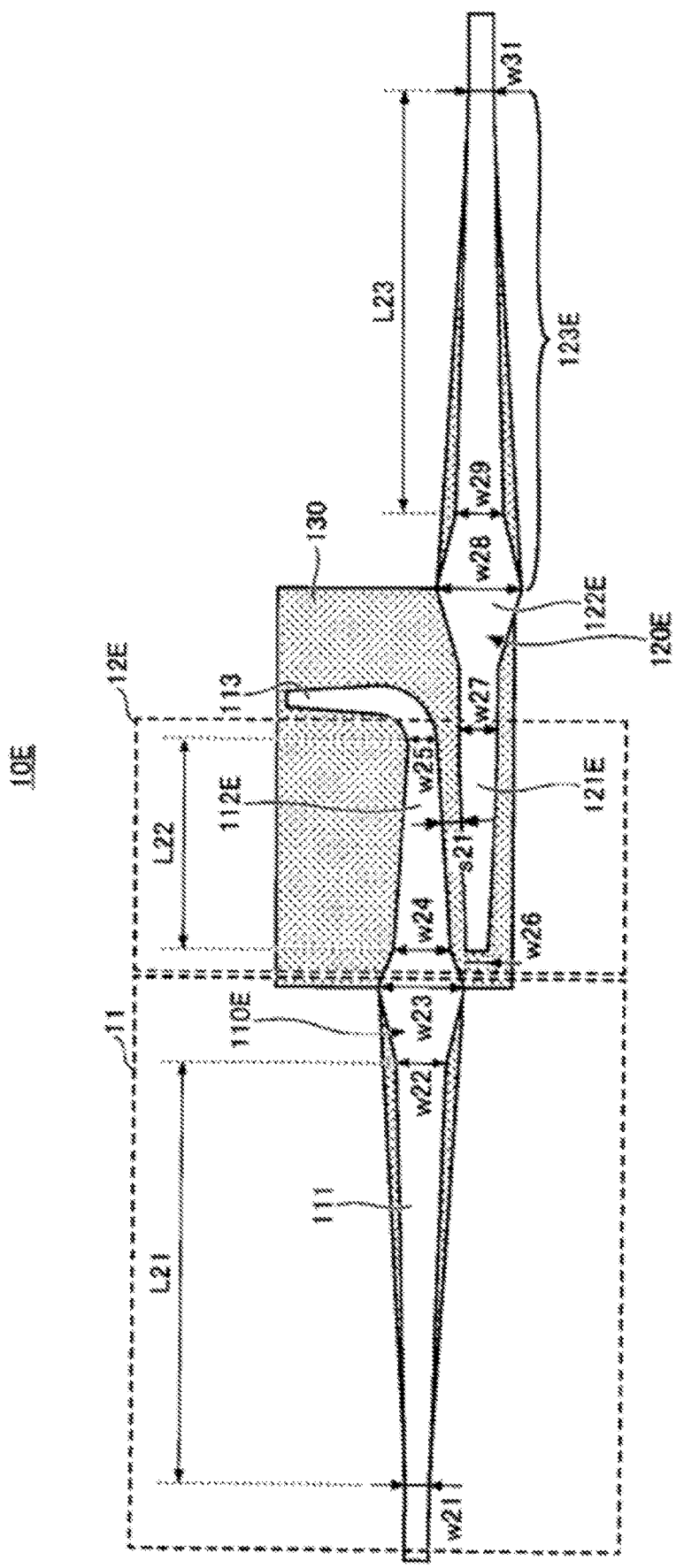
FIG. 15 is a view illustrating a configuration of a modification.

FIG. 15 illustrates a specific configuration of an optical circuit element 10E as still another configuration example. The optical circuit element 10E includes a first waveguide 110E and a second waveguide 120E. The first waveguide 110E includes a first tapered waveguide 111, a second tapered waveguide 112E, and a curved waveguide 113. The first tapered waveguide 111 functions as a polarization rotator 11.

The second waveguide 120E includes a coupled waveguide 121E, a third tapered waveguide 122E, and a fourth tapered waveguide 123E. In FIG. 15, the width of the coupled waveguide 121E of the second waveguide 120E is also designed to be variable.

The second tapered waveguide 112E of the first waveguide 110E and the coupled waveguide 121E of the second waveguide 120E form an asymmetric directional coupler 12E. The fourth tapered waveguide 123E functions as a cut filter for unnecessary polarization components (for example, a TM0 component).

Consider a case where light propagates from the first waveguide 110E to the second waveguide 120E side. As one design example, a width w21 on an input side of the first tapered waveguide 111 of the first waveguide 110E is 0.4 µm and is once widened to a width w22 of 0.65 µm, and a taper angle is then increased and widened up to a width w23 of 1.6 µm. A taper length L21 between w21 and w22 is set to 60 µm, and TM0 mode and TE1 mode conversion is performed in the tapered region.

The first tapered waveguide 111 with the extended width is connected as the second tapered waveguide 112E to the asymmetric directional coupler 12E. The second tapered waveguide 112E is narrowed to a width w24 of 0.78 µm and is then narrowed with a gentle taper up to a width w25 of 0.69 µm. A taper length L22 from w24 to w25 is 10 µm. In this tapered region, the influence of deviation in the waveguide width in the asymmetric directional coupler 12E is absorbed.

The curved waveguide 113 extends from the second tapered waveguide 112E. The curved waveguide 113 is curved in a direction away from the second waveguide 120E and has a tapered shape in order to reduce unintended reflections, similarly to FIG. 14.

In the asymmetric directional coupler 12E, a distance s21 between the second tapered waveguide 112E of the first waveguide 110E and the coupled waveguide 121E of the second waveguide 120E is, for example, 0.15 µm, which is fixed. The width of the coupled waveguide 121E gradually increases from a width w26 of 0.23 µm to a width w27 of 0.31 µm.

Thereafter, the width is extended to a width w28 of 1.6 µm by the third tapered waveguide 122E and is connected to the fourth tapered waveguide 123E. In the fourth tapered waveguide 123E, the waveguide width is narrowed to a width w29 of 0.65 µm, and is then gently tapered up to a width w31 of 0.4 µm. A taper length L23 in a region from w29 to w31 is 60 µm. This tapered region functions as a cut filter that removes unnecessary polarization components.

The present embodiments have been described on the basis of the specific configuration examples. However, the present embodiments are not limited to the above-described configuration examples, and include various modifications and combinations. For example, the waveguide widths of the first tapered waveguide 111 and the second tapered waveguide 112 of the first waveguide 110 do not need to linearly change and may change in a curved manner. Even in this case, the TM0 and TE1 mode conversion is performed in the first tapered waveguide 111, and the influence of deviation in the waveguide width due to manufacturing errors and the like can be absorbed in the second tapered waveguide 112.

Since it is sufficient that the influence of deviation in the waveguide width is absorbed in the asymmetric directional coupler, the width of at least one of the second segment 112 of the first waveguide 110 or the coupled waveguide 121 of the second waveguide 120 is simply changed along the propagation direction. Therefore, the width of the second segment 112 may be changed by a fixed width and the width of the coupled waveguide 121 may be changed in the light propagation direction.

The shape of the fourth tapered waveguide 123 of the second waveguide 120 can be appropriately designed within a range that satisfies the cutoff condition of unnecessary polarization components. For example, in a case where the light propagates from the first waveguide 110 to the second waveguide 120, the width on the output end of the fourth tapered waveguide 123 may be set to an appropriate value that is equal to or smaller than 0.5 µm to satisfy the cutoff condition of TE1. Further, the taper length of a portion of the fourth tapered waveguide 123, which functions as the cutoff filter, may be set to an appropriate length within a range of 50 µm±15 µm.

In all the above-described configuration examples, the propagation of light is not limited to the propagation from the first waveguide 110 to the second waveguide 120, and may be the propagation from the second waveguide 120 to the first waveguide 110. When the TE0 mode light enters the second waveguide 120, the incident light is coupled as the TE1 mode light to the first waveguide 110 in the asymmetric directional coupler. At this time, since at least one waveguide width of the coupled waveguide 121 or the second tapered waveguide 112 changes in the light propagation direction (or the length direction) in the directional coupler, the effective refractive index for the TE0 mode light and the effective refractive index for the TE1 mode light coincide with or approach each other at any point in the light propagation direction. Thereby, the light can be coupled with the maximum conversion efficiency.

The TE1 mode light coupled to the first waveguide 110 is converted into the TM0 mode light by the first tapered waveguide 111 and output. Thereby, the influence of deviation in the waveguide width due to manufacturing errors or the like is minimized in the asymmetric directional coupler, the variations among each of the products are suppressed, and the conversion efficiency and the transmission characteristics are stabilized.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical circuit element formed on a substrate, the optical circuit element comprising:
a first waveguide;
a second waveguide having a shape in a width direction, the shape being asymmetrical to the first waveguide;
a third waveguide continuous with the second waveguide, a width of the third waveguide increasing along a light propagation direction; and
a fourth waveguide continuous with the third waveguide, a width of the fourth waveguide decreasing along the light propagation direction, wherein
the first waveguide includes a first segment and a second segment, the first segment having a width that changes along the light propagation direction, the second segment continuous with the first segment,
the second waveguide includes a coupled waveguide adjacent to the second segment of the first waveguide, the coupled waveguide has a shape with a width that changes along the light propagation direction,
a distance between the second segment and the coupled waveguide increasing within a range that an effective refractive index of the first waveguide and an effective refractive index of the second waveguide coincide or intersect with each other in the length direction,
a width of an input side of second segment of the first waveguide is a width which there is a TE1 mode refractive, and
a width of an output side of the second segment of the first waveguide is more than the width of the input side of second segment,
a width of an input side of the coupled waveguide is less than a width which a TE0 effective refractive index of the coupled waveguide is less than a TE1 effective refractive index of the second segment of the first waveguide, and
a width of an output side of the coupled waveguide is more than a width which the TE0 effective refractive index of the coupled waveguide is more than the TE1 effective refractive index of the second segment of the first waveguide.

2. The optical circuit element according to claim 1, wherein the first segment forms a first tapered waveguide, and the second segment changes in the width in an opposite direction to the first tapered waveguide along the light propagation direction to form a second tapered waveguide.

3. The optical circuit element according to claim 1, wherein the coupled waveguide has a tapered shape with the width that changes in the light propagation direction.

4. The optical circuit element according to claim 1, wherein the coupled waveguide includes a tapered shape with the width that changes in the light propagation direction, and
a distance between the coupled waveguide and the second segment changes along the light propagation direction.

5. The optical circuit element according to claim 1, wherein the second waveguide includes a tapered waveguide with a width that changes in the light propagation direction in a subsequent stage of the coupled waveguide.

6. The optical circuit element according to claim 1, wherein the first waveguide includes a curved waveguide that extends from the second segment in an opposite direction to the second waveguide and is terminated.

7. The optical circuit element according to claim 1, the first waveguide and a second waveguide are rib-shaped waveguides.

8. An optical communication apparatus comprising:
a first waveguide;
a second waveguide having a shape in a width direction, the shape being asymmetrical to the first waveguide;
a third waveguide continuous with the second waveguide, a width of the third waveguide increasing along a light propagation direction; and
a fourth waveguide continuous with the third waveguide, a width of the fourth waveguide decreasing along the light propagation direction, wherein
the first waveguide includes a first segment and a second segment, the first segment having a width that changes along the light propagation direction, the second segment continuous with the first segment,
the second waveguide includes a coupled waveguide adjacent to the second segment of the first waveguide, the coupled waveguide has a shape with a width that changes along the light propagation direction,
a distance between the second segment and the coupled waveguide increasing within a range that an effective refractive index of the first waveguide and an effective refractive index of the second waveguide coincide or intersect with each other in the length direction,
a width of an input side of second segment of the first waveguide is a width which there is a TE1 mode refractive, and
a width of an output side of the second segment of the first waveguide is more than the width of the input side of second segment,
a width of an input side of the coupled waveguide is less than a width which a TE0 effective refractive index of the coupled waveguide is less than a TE1 effective refractive index of the second segment of the first waveguide, and
a width of an output side of the coupled waveguide is more than a width which the TE0 effective refractive index of the coupled waveguide is more than the TE1 effective refractive index of the second segment of the first waveguide.

9. The optical communication apparatus according to claim 8, wherein the first segment forms a first tapered waveguide, and the second segment changes in the width in an opposite direction to the first tapered waveguide along the light propagation direction to form a second tapered waveguide.

10. The optical communication apparatus according to claim 8, wherein the coupled waveguide has a tapered shape with the width that changes in the light propagation direction.

11. The optical communication apparatus according to claim 8, wherein the coupled waveguide includes a tapered shape with the width that changes in the light propagation direction, and
a distance between the coupled waveguide and the second segment changes along the light propagation direction.

12. The optical communication apparatus according to claim 8, wherein the second waveguide includes a tapered waveguide with a width that changes in the light propagation direction in a subsequent stage of the coupled waveguide.

13. The optical communication apparatus according to claim 8, wherein the first waveguide includes a curved waveguide that extends from the second segment in an opposite direction to the second waveguide and is terminated.

14. The optical communication apparatus according to claim 8, the first waveguide and a second waveguide are rib-shaped waveguides.

15. A method for manufacturing optical circuit element, the method comprising:
- forming a first waveguide on a substrate;
- forming a second waveguide having a shape in a width direction, the shape being asymmetrical to the first waveguide;
- forming a third waveguide continuous with the second waveguide, a width of the third waveguide increasing along a light propagation direction; and
- forming a fourth waveguide continuous with the third waveguide, a width of the fourth waveguide decreasing along the light propagation direction, wherein
- the first waveguide includes a first segment and a second segment, the first segment having a width that changes along a light propagation direction, the second segment continuous with the first segment,
- the second waveguide includes a coupled waveguide adjacent to the second segment of the first waveguide, the coupled waveguide has a shape with a width that changes along the light propagation direction,
- a distance between the second segment and the coupled waveguide increasing within a range that an effective refractive index of the first waveguide and an effective refractive index of the second waveguide coincide or intersect with each other in the length direction,
- a width of an input side of second segment of the first waveguide is a width which there is a TE1 mode refractive, and
- a width of an output side of the second segment of the first waveguide is more than the width of the input side of second segment,
- a width of an input side of the coupled waveguide is less than a width which a TE0 effective refractive index of the coupled waveguide is less than a TE1 effective refractive index of the second segment of the first waveguide, and
- a width of an output side of the coupled waveguide is more than a width which the TE0 effective refractive index of the coupled waveguide is more than the TE1 effective refractive index of the second segment of the first waveguide.

16. The method according to claim 15, the first waveguide and the second waveguide are rib-shaped waveguides.

\* \* \* \* \*